Aug. 3, 1948.　　C. C. WALLACE　　2,446,395
VEHICLE SPRING SUPPORTER
Filed May 14, 1945
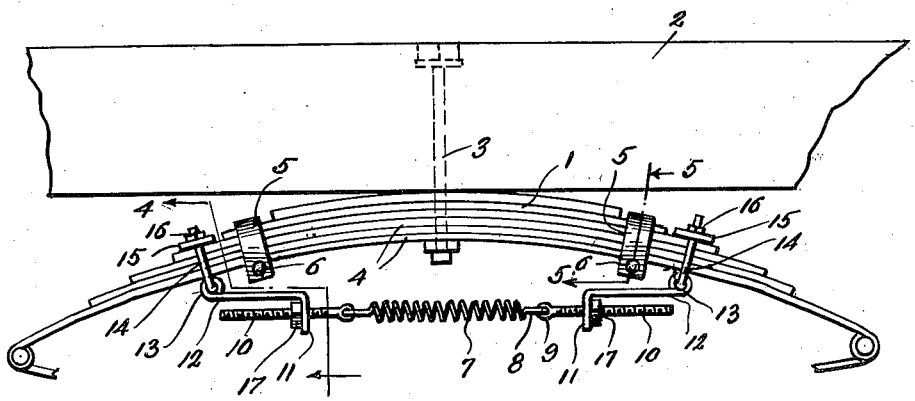
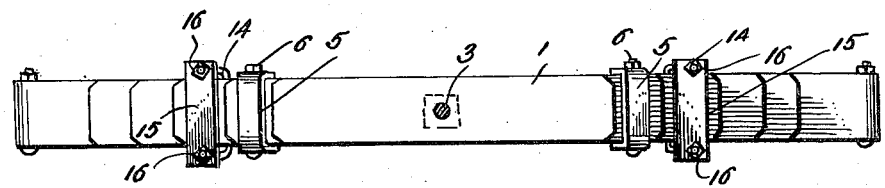
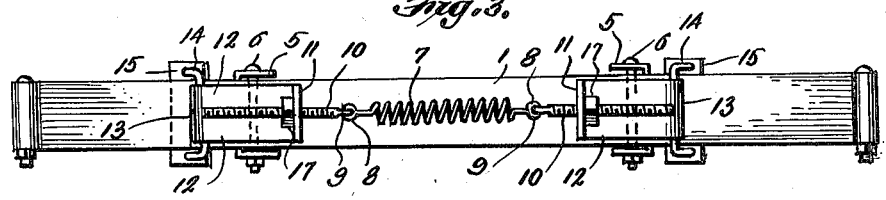
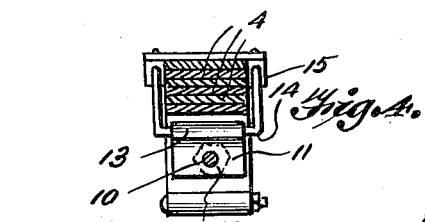
Inventor
COLUMBUS C. WALLACE
By Ross J. Woodward
Attorney Patented Aug. 3, 1948

2,446,395

UNITED STATES PATENT OFFICE 2,446,395

VEHICLE SPRING SUPPORTER

Columbus C. Wallace, Fort Henry, Tenn.

Application May 14, 1945, Serial No. 593,648

2 Claims. (Cl. 267—28)

This invention relates to a support for a vehicle spring and while it is particularly adapted for use upon a spring for an automobile, it will be understood that it may be applied to springs of other types of vehicles.

One object of the invention is to provide a vehicle spring with an attachment serving to reinforce the vehicle spring and yieldably limit flexing movements of the vehicle spring when subjected to jolts as the vehicle passes over rough places in a road.

Another object of the invention is to provide a supporter which extends longitudinally of a vehicle spring and is so connected with end portions of the vehicle spring that it will be under tension and apply pull to yieldably resist flexing of the vehicle spring.

Another object of the invention is to provide a spring supporter including a spring having threaded rods or bolts at its ends which extend longitudinally from the spring and pass through brackets connected with the vehicle spring so that when nuts of the bolts or rods are tightened the spring of the supporter will be placed under the desired tension.

Another object of the invention is to provide the brackets of the supporter with shackles by means of which they may be firmly held in gripping engagement with portions of a vehicle spring in predetermined spaced relation to ends thereof and not only hold the brackets to the leaf spring but also assist in holding leaves of the leaf spring in contacting engagement with each other.

Another object of the invention is to provide mounting means for the supporter which permits it to be easily mounted in operative relation to a vehicle spring of conventional formation and also allows it to be easily removed for transfer to the spring of another vehicle when so desired.

The invention is illustrated in the accompanying drawings, wherein:

Figure 1 is a view in elevation showing the improved spring supporter in use.

Figure 2 is a view looking down upon Figure 1.

Figure 3 is a bottom view of the Figure 1.

Figure 4 is a sectional view on the line 4—4 of Figure 1.

Figure 5 is a sectional view on the line 5—5 of Figure 1.

Figure 6 is a perspective view of the improved spring supporter.

The spring to which the improved supporter has been shown applied is a leaf spring of the type used on automobiles and other vehicles and has been shown connected with a bar 2 which may be a chassis bar of an automobile or any other portion of a vehicle to which the spring may be secured by a bolt 3. This spring is of conventional construction and consists of a suitable number of leaves 4 of progressively varying length and about the leaves are disposed clamps 5 which bind the leaves to each other when the bolts 6 are tightened. When the vehicle is in use and traveling along rough roads the springs flex and absorb shocks. It will be understood that the improved supporter may be applied to other specific forms of springs.

In order to reinforce the spring 1, the supporter or shock absorbing means constituting the subject matter of this invention is applied to the vehicle spring. This supporter has a helical spring 7 which is formed at its ends with hooks 8 for engaging through eyes 9 of the bolts or threaded rods 10. These rods or eye bolts extend longitudinally of the spring 7 from opposite ends thereof and pass through flanges or tongues 11 formed by downwardly bent ends of brackets 12 which are formed of strips of strong metal. These brackets extend longitudinally of the threaded rods, over the same, and outer ends of the brackets are rolled to form sleeves 13 through which are engaged shackles 14. These shackles 14 are formed of metal rods bent to U-shape and when the supporter is applied to the vehicle spring they straddle the vehicle spring with their arms disposed against opposite sides thereof and passing through metal plates 15 so that when nuts 16 are tightened the shackles will be firmly secured to the vehicle spring and prevented from slipping longitudinally thereof. It should also be noted that the plates 15 will be held against movement inwardly of ends of the vehicle spring by engagement with ends of certain of the leaves 4. The shackles are preferably attached to the vehicle spring in such relation to the clamps 5 that if they attempt to move to a canted position and shift along the vehicle spring, this will be stopped by engagement of the shackles 14 with the clamps 5. When the nuts 17 of the eye bolts 10 are tightened they bear against the tongues 11 and exert pull on the bolts so that the spring 7 will be stretched and placed under designed tension and yieldably resist flexing of the vehicle spring. An auxiliary shock absorber or support so applied will very effectively cooperate with the vehicle spring to brace the vehicle spring and since the brackets 12 are pivoted to the shackles flexing of the vehicle spring will not be interfered with. By shifting the shackles 14 closer to ends of the vehicle spring, greater tension may be applied to the spring 7 when the nuts 11 are tightened.

Having described the invention, what is claimed is:

1. In combination with a vehicle spring including a plurality of longitudinally bowed leaves and clips binding the leaves to each other, a reinforcement for the vehicle spring comprising a helical spring extending longitudinally of the vehicle spring in a straight line and in spaced relation to the concaved surface of the vehicle spring, and having hooks at its ends, eye bolts carried by the hooks of the helical spring and extending from opposite ends of the helical spring longitudinally thereof, brackets formed of stiff metal strips and each having its inner end portions bent to form a tongue having an opening therein and its outer end rolled to form a sleeve, said eye bolts passing through the openings of the tongues and carrying nuts for engaging the tongues and applying desired tension to the helical spring when tightened, U-shaped clamps having bridge portions loosely passing through said sleeves and their arms extending along opposite sides of the vehicle spring extending across the vehicle spring and having clamping plates projecting from opposite sides thereof and formed with openings through which the arms of said clamps pass, and nuts carried by the arms of the clamps for engaging the plates and tightly holding the clamps to the vehicle spring outwardly of said clips.

2. A reinforcing device for a vehicle spring comprising a helical spring having hooks at its ends, eye bolts loosely carried by the hooks of the helical spring, longitudinally extending brackets at opposite ends of the helical spring formed from strips of stiff metal having inner end portions bent to provide tongues and outer ends rolled to form sleeves transversely extending, the tongues being formed with openings through which said bolts pass, U-shaped clamps having bridge portions loosely passing through said sleeves and arms extending from ends of the sleeves for straddling a vehicle spring, of a length adapting them to extend across a vehicle spring and having opposite clamping plates formed with openings through which the arms of said clamps pass, nuts carried by said arms, for engaging the plates, and nuts carried by said bolts for engaging the tongues of the brackets and tensioning the helical spring.

COLUMBUS C. WALLACE.

REFERENCES CITED

The following references are of record in the file of this patent:

UNITED STATES PATENTS

| Number | Name | Date |
| --- | --- | --- |
| 154,892 | Norris | Sept. 8, 1874 |
| 1,124,964 | Smith | Jan. 12, 1915 |
| 1,775,841 | Austin | Sept. 16, 1930 |

FOREIGN PATENTS

| Number | Country | Date |
| --- | --- | --- |
| 5623/27 | Australia | Dec. 22, 1927 |
| 823,105 | France | Oct. 11, 1937 |